United States Patent
Lee

(10) Patent No.: US 8,030,826 B2
(45) Date of Patent: Oct. 4, 2011

(54) ENERGY REGENERATION DEVICE FOR SUSPENSION SYSTEM

(75) Inventor: Un Koo Lee, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 139 days.

(21) Appl. No.: 12/512,662

(22) Filed: Jul. 30, 2009

(65) Prior Publication Data

US 2010/0052475 A1    Mar. 4, 2010

(30) Foreign Application Priority Data

Aug. 6, 2008 (KR) .................. 10-2008-0077141

(51) Int. Cl.
*H01L 41/113* (2006.01)
(52) U.S. Cl. ....................................................... 310/339
(58) Field of Classification Search ................... 310/339
See application file for complete search history.

(56) References Cited

U.S. PATENT DOCUMENTS

| | | | |
|---|---|---|---|
| 4,458,234 A * | 7/1984 | Brisard | 310/339 |
| 6,672,434 B2 * | 1/2004 | Schnur et al. | 188/266.7 |
| 2008/0084138 A1 * | 4/2008 | Micallef | 310/339 |

FOREIGN PATENT DOCUMENTS

| | | |
|---|---|---|
| KR | 1998-028334 U | 8/1998 |
| KR | 10-2004-0091890 A | 11/2004 |
| KR | 10-2007-0037196 A | 4/2007 |

* cited by examiner

*Primary Examiner* — Derek Rosenau

(74) *Attorney, Agent, or Firm* — Morgan, Lewis & Bockius LLP

(57) ABSTRACT

An energy regeneration device for a suspension system may include a transforming body configured to be compressed or elongated by a chassis spring of the suspension system, and at least an electric generating member that are electrically connected each other and configured to be compressed or elongated with the transforming body.

9 Claims, 5 Drawing Sheets

ENERGY REGENERATION DEVICE FOR SUSPENSION SYSTEM

CROSS-REFERENCE TO RELATED APPLICATION

The present invention claims priority to Korean Patent Application Number 10-2008-0077141 filed on Aug. 6, 2008, the entire contents of which are incorporated herein for all purposes by this reference.

BACKGROUND OF THE INVENTION

1. Field of the Invention

The present invention relates to an energy regeneration device for a suspension system. More particularly, the present invention relates to an energy regeneration device that is disposed within a chassis spring of a suspension system, and that transforms kinetic energy generated by elongation and compression of the chassis spring to electrical energy by the piezo effect.

2. Description of Related Art

Basically, a suspension device of a vehicle is provided with a link or links for connecting a vehicle body, it supports in a vertical direction using a chassis spring and a shock absorber, and it can modulate horizontal relative movement of a vehicle body and a wheel by modulating rigidity and flexibility.

The suspension system is required to provide a comfort characteristic by preventing irregular input of various road conditions when it is driven, and stable characteristics when it turns or brakes.

A general scheme of a suspension system, as shown in FIG. 5, includes a knuckle 103 for rotatably supporting a wheel 101 and a lower arm for connecting a lower portion of the knuckle 103 to a vehicle body.

An upper portion of the knuckle 103 is connected to a lower portion of a strut bar (shock absorber) 107 and an upper portion of the strut bar 107 is mounted to a vehicle through a top mount 109.

An upper spring seat 113 and a lower spring seat 115 are disposed on the strut bar 107, and a chassis spring 111 is configured between the upper spring seat 113 and the lower spring seat 115.

The chassis spring 111 can reduce impact from the road and the strut bar 107 can reduce free vibration of the chassis spring 111 so that ride comfort can be enhanced.

An end of a stabilizer bar 117 configured to a vehicle body is connected to the strut bar 107 via a connecting link 119, and the stabilizer bar 117 controls roll of the vehicle body.

As described above, a strut-type suspension system is not complicated in scheme, is not expensive, guarantees a large space, and also provides small changes in layout of a wheel 101 according to mounting position.

The strut-type suspension system repeats bumps and rebounds according to driving conditions, and the chassis spring 111 repeats compressions and elongations to reduce impact from the road.

The chassis spring 111 generates kinetic energy by compressions and elongations; however the kinetic energy has not been recovered.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an energy regeneration device for a suspension system that that is disposed within a chassis spring of a suspension system, and that transforms kinetic energy generated by elongation and compression of the chassis spring to electrical energy by the piezo effect.

In an aspect of the present invention, the energy regeneration device for a suspension system, may include a transforming body configured to be compressed or elongated by a chassis spring of the suspension system, and at least an electric generating member that are electrically connected each other and configured to be compressed or elongated with the transforming body.

The transforming body may be disposed between coils of the chassis spring of the suspension system.

The electric generating members may be aligned between adjacent pitches of the coils so that the electric generating members are compressed or elongated by relative movements of the coils.

The transforming body may be formed by an elastic material that has electrical insulating properties, wherein receiving grooves are formed on upper and lower sides of the transforming body in order to receive the coils of the chassis spring therein and support the chassis spring.

In another aspect of the present invention, receiving grooves may be formed on upper and lower sides of the transforming body in order to support the chassis spring.

An electric wire may be disposed in the transforming body for electrically connecting the electric generating members, and a connector is disposed to the transforming body for electrically connecting the electric wire.

In further another aspect of the present invention, the energy regeneration device may further include a rectifier that is electrically connected with the electric generating members through the connector and rectifies an electric current made by the electric generating members.

In another aspect of the present invention, the energy regeneration device may further include a battery that is electrically connected with the rectifier and stores electrical energy.

The electric generating member may be a piezoelectric element.

An energy regeneration device for a suspension system according to various aspects of the present invention may change kinetic energy that is generated by elongation and compression of the chassis spring to electrical energy so that energy efficiency can be enhanced.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
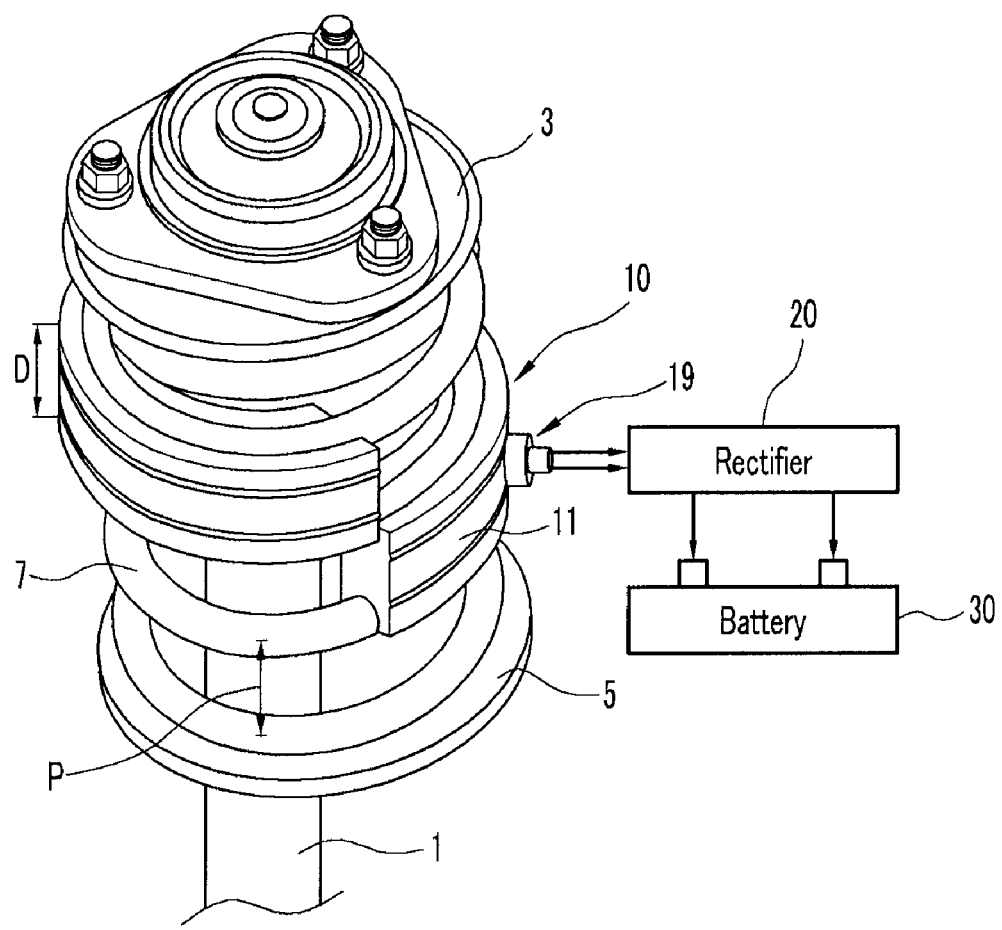
FIG. 1 is a partial perspective view of a suspension system provided with an exemplary energy regeneration device according to the present invention.
Figure 2:
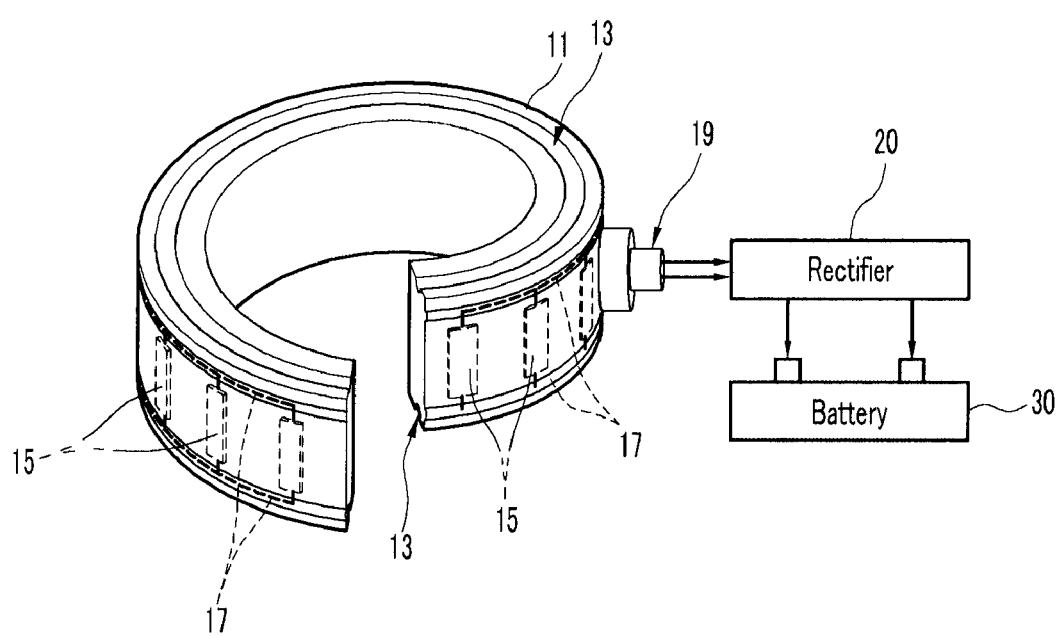
FIG. 2 is a perspective view of an exemplary energy regeneration device according to the present invention.
Figure 3:
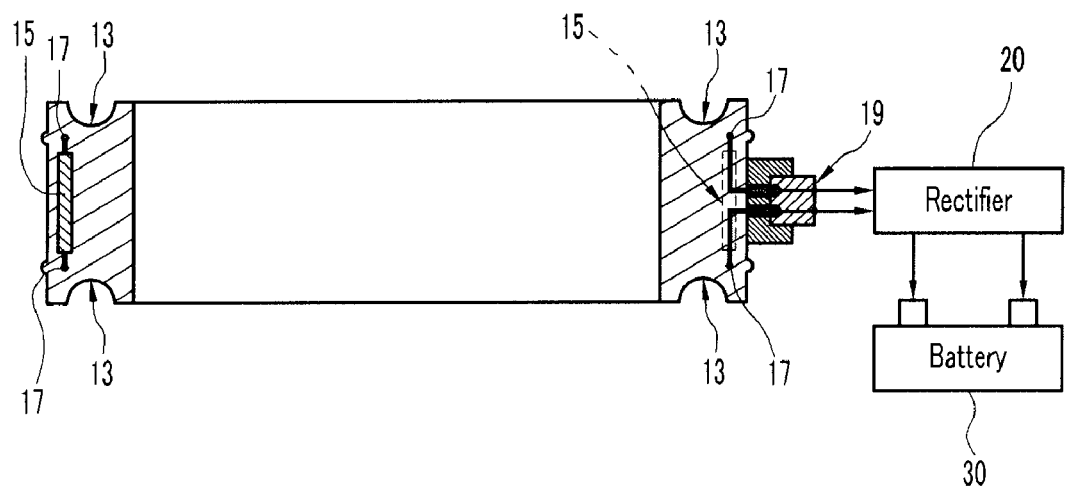
FIG. 3 is a cross-sectional view of an exemplary energy regeneration device according to the present invention.

FIG. 1 is a partial perspective view of a suspension system provided with an energy regeneration device according to various embodiments of the present invention, FIG. 2 is a perspective view of an energy regeneration device according to various embodiments of the present invention, and FIG. 3 is a cross-sectional view of an energy regeneration device according to various embodiments of the present invention.

An energy regeneration device 10 according to various embodiments of the present invention, as shown in FIG. 1, is disposed within a chassis spring 7 that is disposed between an upper spring seat 3 and a lower spring seat 5 configured to a strut bar 1, and regenerates electrical energy from kinetic energy produced by compression and elongation of the chassis spring 7.

The energy regeneration device 10, as shown in FIG. 2 and FIG. 3, includes a transforming body 11 that is inserted within the chassis spring 7 of the suspension system and is transformed according to compression and elongation of the chassis spring 7.

The transforming body 11 is preferably formed of an elastic material that has electrical insulating properties.

Receiving grooves 13 are formed on upper and lower sides of the transforming body 11 in order to support the chassis spring 7, and the width of the transforming body 11 is substantially the same as a pitch of the chassis spring 7.

A plurality of piezoelectric elements 15 are disposed within the transforming body 11 at a predetermined distance.

In various embodiments of the present invention, the piezoelectric elements may be aligned between adjacent pitches of the coils so that the piezoelectric elements are compressed or elongated by relative movements of the coils.

The piezoelectric elements 15 are electrically connected to each other by an electric wire 17 disposed within the transforming body 11.

The piezoelectric element 15 is electrically connected to a rectifier 20 through the electric wire 17, and the rectifier 20 is supplied with electricity generated in the piezoelectric elements 15 and rectifies it.

The electric wire 17 for connecting each piezoelectric element 15 and a connector 19 for electrically connecting the electric wire 17 and the rectifier 20 are disposed in the transforming body 11.

The rectifier 20 is electrically connected with a battery 30 and rectified electrical energy can be stored in the battery 30.

When the piezoelectric element 15 is transformed by an external force, current can be generated along transformed directions, that is, the piezoelectric element 15 vibrates by an external force from the chassis spring 7 and generates an alternating current.

The alternating current is rectified to a direct current (DC) in the rectifier 20 and stored in the battery 30.

Figure 4:
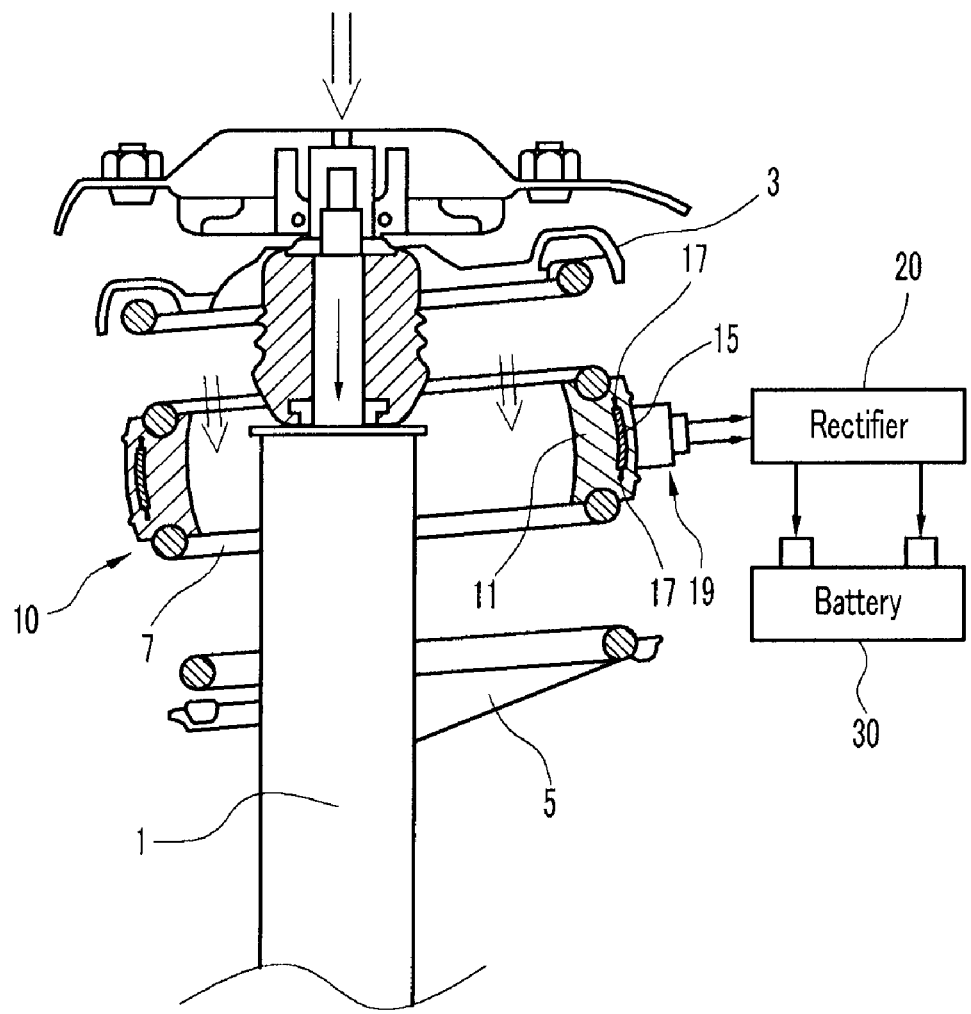
FIG. 4 is a drawing explaining operations of an exemplary energy regeneration device according to the present invention.
Figure 5:
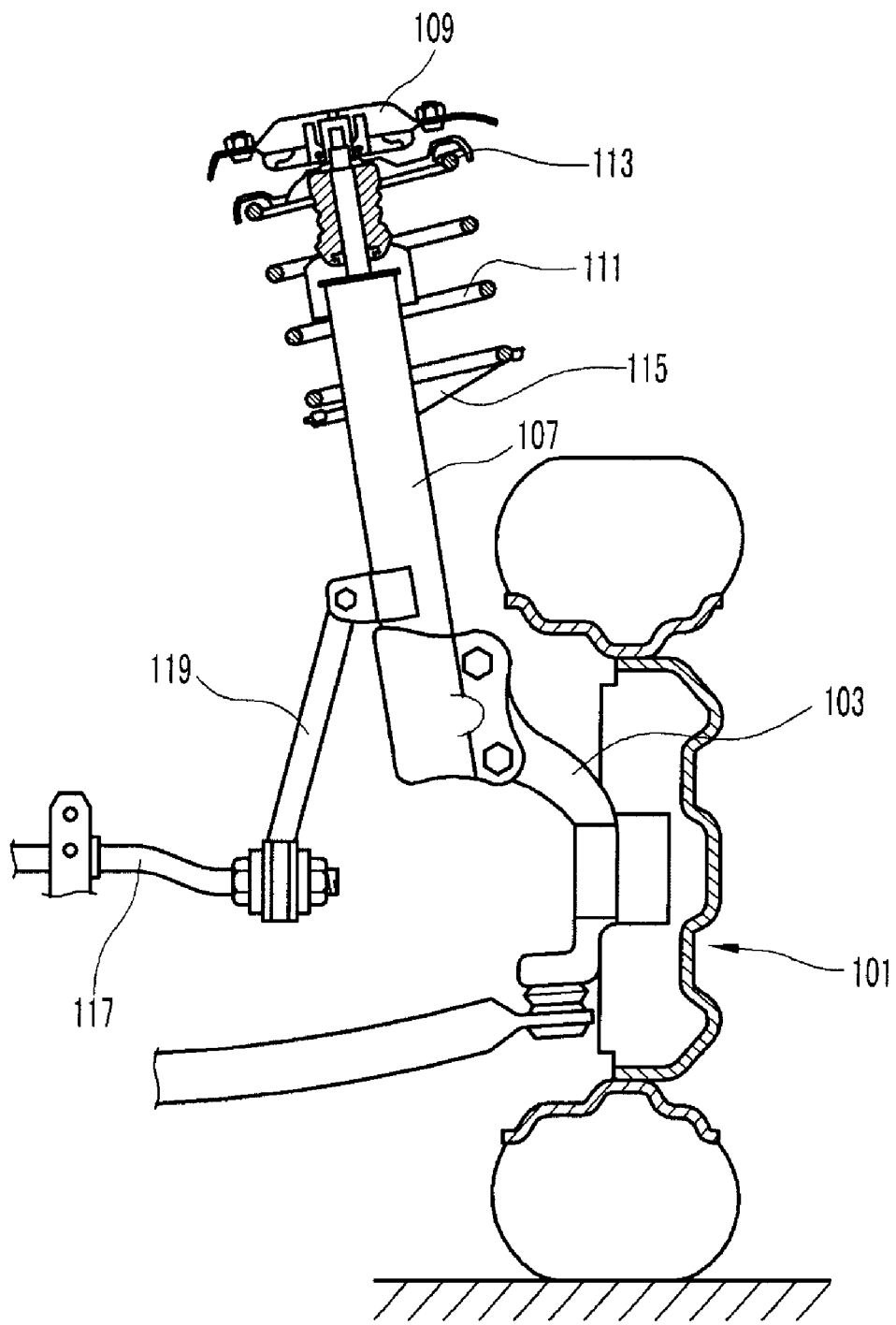
FIG. 5 is a schematic drawing showing a general strut type suspension system.

Hereinafter, operations of an energy regeneration device according to various embodiments will be described referring to FIG. 4.

When the chassis spring 7 is compressed so that the pitch P of each coil of the chassis spring 7 is reduced, a center of the transforming body 11 is bulged and each piezoelectric element 15 within the transforming body 11 is transformed.

Then each piezoelectric element 15 generates alternating current, the alternating current flows to the rectifier 20 through the electric wire 17, and the alternating current is rectified in the rectifier 20 and stored in the battery 30. That is, the kinetic energy of the chassis spring 7 that is generated by bumping of a vehicle can be regenerated as electrical energy.

For convenience in explanation and accurate definition in the appended claims, the terms "upper" and "lower" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An energy regeneration device comprising:
a transforming body configured to be compressed or elongated by a chassis spring of the suspension system; and
at least an electric generating member configured to be compressed or elongated with the transforming body;
wherein the transforming body is disposed between coils of the chassis spring of the suspension system; and
wherein the electric generating members are aligned between adjacent pitches of the coils so that the electric generating members are compressed or elongated by relative movements of the coils.

2. The energy regeneration device of claim 1, wherein the transforming body is formed by an elastic material that has electrical insulating properties.

3. The energy regeneration device of claim 2, wherein receiving grooves are formed on upper and lower sides of the transforming body in order to receive the coils of the chassis spring therein and support the chassis spring.

4. The energy regeneration device of claim 1, wherein receiving grooves are formed on upper and lower sides of the transforming body in order to support the chassis spring.

5. The energy regeneration device of claim 1, wherein an electric wire is disposed in the transforming body for electrically connecting the electric generating members, and a connector is disposed to the transforming body for electrically connecting the electric wire.

6. The energy regeneration device of claim 5, further comprising a rectifier that is electrically connected with the electric generating members through the connector and rectifies an electric current made by the electric generating members.

7. The energy regeneration device of claim 6, further comprising a battery that is electrically connected with the rectifier and stores electrical energy.

8. The energy regeneration device of claim 1, wherein the electric generating member is a piezoelectric element.

9. A passenger vehicle comprising the energy regeneration device of claim 1.

* * * * *